(12) United States Patent
Fournier, II et al.

(10) Patent No.: US 10,402,487 B1
(45) Date of Patent: Sep. 3, 2019

(54) CREATION OF NOTECARD ITEMS AND ASSOCIATION WITH DIGITAL DOCUMENTS

(71) Applicant: Microsoft Technology Licensing, LLC, Redmond, WA (US)

(72) Inventors: Keith Fournier, II, Bothell, WA (US); Derik B. Stenerson, Redmond, WA (US); Yibing Zhu, Woodinville, WA (US); Victor Poznanski, Redmond, WA (US); Theresa Estrada, Redmond, WA (US); Sian Lindley, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/934,543

(22) Filed: Mar. 23, 2018

Related U.S. Application Data

(60) Provisional application No. 62/628,631, filed on Feb. 9, 2018.

(51) Int. Cl.
*G06F 17/24* (2006.01)
*G06F 3/0488* (2013.01)
(Continued)

(52) U.S. Cl.
CPC .......... *G06F 17/241* (2013.01); *G06F 3/0486* (2013.01); *G06F 3/0488* (2013.01);
(Continued)

(58) Field of Classification Search
CPC .................................................. G06F 17/241
See application file for complete search history.

(56) References Cited

U.S. PATENT DOCUMENTS

| | | | | |
|---|---|---|---|---|
| 5,146,552 A | * | 9/1992 | Cassorla | G06F 17/241 715/200 |
| 5,852,436 A | * | 12/1998 | Franklin | G06F 3/0486 715/867 |

(Continued)

FOREIGN PATENT DOCUMENTS

WO  2008104495 A1  9/2008

OTHER PUBLICATIONS

"International Search Report and Written Opinion Issued in PCT Application No. PCT/US2019/015493", dated Mar. 28, 2019, 10 Pages.

*Primary Examiner* — Asher D Kells

(57) ABSTRACT

Non-limiting examples of the present disclosure relate to creation and management of exemplary notecard items that are reusable in different contexts and across different applications/services. Exemplary notecard items may be created and presented through a user interface of an application/service. A notecard item is individual, self-contained digital data object that provides content to supplement a digital document. Exemplary notecard items live outside of an application/service, in which the notecard item is created or used, where a notecard item may be linked to a digital document but also exists as a separate object. For instance, an exemplary notecard file may be created for management of a created notecard item, where the notecard file is stored in one or more data storages (e.g., a local cache of a computing device and/or a distributed data storage) that is accessible by applications/services.

20 Claims, 11 Drawing Sheets

(51) Int. Cl.
*G06F 3/0486* (2013.01)
*G06F 3/0484* (2013.01)
*G06F 17/22* (2006.01)
*G06F 16/93* (2019.01)

(52) U.S. Cl.
CPC .......... *G06F 3/04842* (2013.01); *G06F 16/94* (2019.01); *G06F 17/2235* (2013.01)

(56) References Cited

U.S. PATENT DOCUMENTS

| | | | | |
|---|---|---|---|---|
| 6,212,534 B1* | 4/2001 | Lo | ........................ | G06Q 10/10 715/205 |
| 6,687,878 B1* | 2/2004 | Eintracht | .............. | G06F 17/241 707/E17.117 |
| 2003/0196094 A1* | 10/2003 | Hillis | ..................... | G06F 21/64 713/179 |
| 2004/0205545 A1* | 10/2004 | Bargeron | ............... | G06F 17/241 715/205 |
| 2005/0091578 A1* | 4/2005 | Madan | ................... | G06F 17/241 715/201 |
| 2008/0256113 A1* | 10/2008 | Rasmussen | ......... | G06F 17/2205 |
| 2008/0256114 A1* | 10/2008 | Rasmussen | ......... | G06F 17/2205 |
| 2010/0119164 A1* | 5/2010 | Singhal | ................. | G06F 19/321 382/233 |
| 2012/0060082 A1* | 3/2012 | Edala | .................... | G06F 17/241 715/231 |
| 2012/0284618 A1* | 11/2012 | Bailor | ................... | G06F 17/241 715/255 |
| 2015/0135054 A1* | 5/2015 | Harley | .................. | G06F 17/241 715/230 |
| 2015/0149882 A1* | 5/2015 | Hsu | ....................... | G06F 17/241 715/230 |
| 2017/0142042 A1 | 5/2017 | Bandi et al. | | |
| 2017/0220359 A1 | 8/2017 | Aguilar-Gamez et al. | | |

\* cited by examiner

100

200

220

260

280

CREATION OF NOTECARD ITEMS AND ASSOCIATION WITH DIGITAL DOCUMENTS

CROSS-REFERENCE TO RELATED APPLICATIONS

This application claims priority to U.S. Provisional Patent Application No. 62/628,631, entitled "CREATION OF NOTECARD ITEMS AND ASSOCIATION WITH DIGITAL DOCUMENTS", filed on Feb. 9, 2018, which is incorporated by reference herein in its entirety.

BACKGROUND

Current applications/service enable creation of electronic notes. However, an electronic note is typically tied to a specific digital document in which the electronic note is created. As an example, a user may create a review comment for content in a digital document, but that review comment lives within the confines of the digital document. As such, electronic notes are traditionally specific to a digital document and not truly extensible for cross-application usage. From a technical perspective, traditional electronic notes are not adaptable to fit a context of another digital document, limiting usage and applicability.

Some applications enable users to create electronic notes (e.g., handwritten notes) that operate as separate data objects that can be added to digital documents. However, such instances of electronic notes are treated as traditional data objects that comprise limited data and metadata for contextual relevance and cross-application usage. Many examples of such electronic notes do not even create a separate extensible data file for electronic notes. A common user interface example, illustrating this issue, is the case where a handwritten note is created and stored in association with a notes application/service, but a user has to manually access that electronic note (in another data repository) and manually recall a context in which the electronic note was created. Traditional electronic notes objects, when attached to a digital document, do not account for a context of the document in which the electronic note is being attached. Such electronic notes may be generally linked with a digital document without regard to a context in which a note is being used. Another technical issue related to the fidelity of electronic notes, where a traditional electronic note is not typically modifiable to account for a context in which an electronic note is being linked with a digital document.

SUMMARY

In view of the foregoing technical shortcomings, non-limiting examples of the present disclosure relate to creation and management of exemplary notecard items that are reusable in different contexts and across different applications/services. Exemplary notecard items may be created and presented through a user interface of an application/service. A notecard item is individual, self-contained digital data object that provides content to supplement a digital document. Exemplary notecard items live outside of an application/service, in which the notecard item is created or used, where a notecard item may be linked to a digital document but also exists as a separate object. For instance, an exemplary notecard file may be created for management of a created notecard item, where the notecard file is stored in one or more data storages (e.g., a local cache of a computing device and/or a distributed data storage) that is accessible by applications/services.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
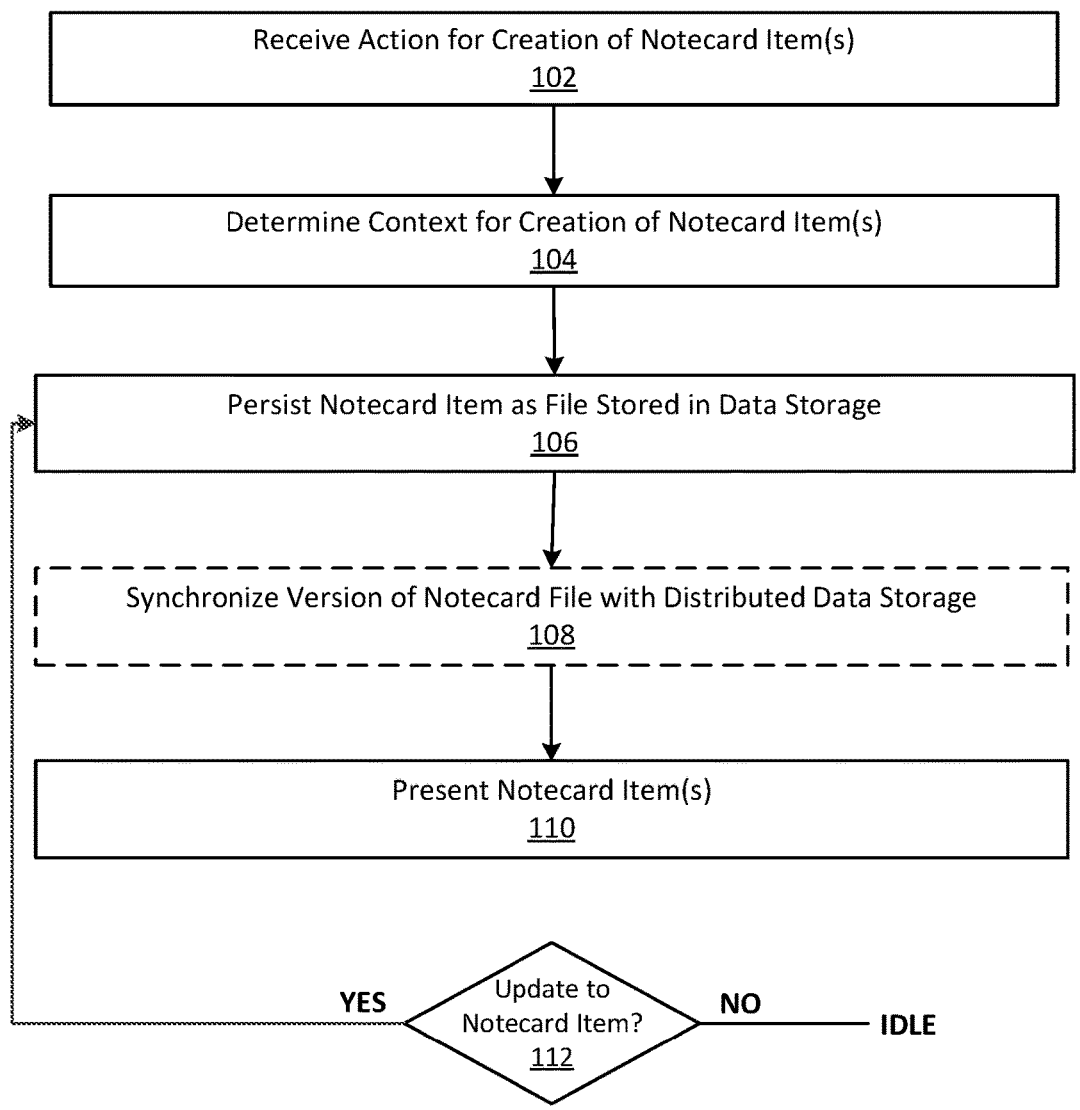
FIG. 1 illustrates an exemplary method related to creation and management of an exemplary notecard item, with which aspects of the present disclosure may be practiced.

Non-limiting examples of the present disclosure relate to creation and management of exemplary notecard items that are reusable in different contexts and across different applications/services. Exemplary notecard items may be created and presented through a user interface of an application/service. A notecard item is individual, self-contained digital data object that provides content to supplement a digital document. A notecard item may comprise any type of content, along or in aggregate, comprising but not limited to: text, rich content (including links, charts/graphs, multimedia, etc.), handwritten input and composite data objects (including layered content), among other examples. Exemplary notecard items live outside of an application/service, in which the notecard item is created or used, where a notecard item may be linked to a digital document but also exists as a separate object. For instance, an exemplary notecard file may be created for management of a created notecard item, where the notecard file is stored in one or more data storages (e.g., a local cache of a computing device and/or a distributed data storage) that is accessible by applications/services. As an example, an application programming interface (API) may be configured to enable interfacing between applications/services for creation of notecard items as well as access to and management of created notecard items. In other instances, functionality for creation and management of notecard files and notecard items may be programmed directly into the code of applications/services to enable creation and management of notecard items.

In any case, created notecard items need not stick with a specific digital document forever unless so desired. A user may link one or more notecard items to a digital document such that the notecard item stays with the document until removed. Metadata may be maintained in an exemplary notecard file for a notecard item that enables the notecard item to be a separate object but also identify associations between a notecard item and a digital document, a notecard item and other notecard items, etc. Created notecard items may be persisted in a data storage as stored notecard files. A notecard file may comprise data and metadata associated with a created notecard item as well as content portions/objects that are included in a notecard item. Whether notecard items or grouped together or not, each notecard item may be associated with its own notecard file. This provides, among other technical benefits, improvement of management and recall of created notecard items. While exemplary notecards items are associated with notecard files, examples described herein are configured to automatically occur on behalf of a user without a user having to separately access and manage notecard files.

One example of a data storage, used for storage of notecard files, is a distributed data storage that is associated with an exemplary notecard item management service. An exemplary notecard item management service extends functionality of exemplary applications/services (e.g., productivity services), which are configured to present notecard items through a user interface. A notecard item management service is configured to interface with exemplary applications/services (e.g., productivity services) to enable creation of notecard files (for notecard items) as well as management of created notecard items. In some instances, an exemplary productivity service may be working offline, where the productivity service is configured to utilize a local data storage (e.g., local cache) of a computing device to manage creation of notecard files as well as collection of data/metadata associated with the creation of a notecard file. In such instances, data for a notecard file may be stored in a local data storage and synchronized with a distributed data storage at a point in time when the productivity service is back online. An exemplary productivity service may be configured to continuously attempt to communicate with the notecard item management service in order to maintain consistency for created notecard items.

Upon, creation (and/or update) of an exemplary notecard item, notecard files may be automatically propagated to the distributed data storage. This may minimize data loss as well as improve processing efficiency during execution of exemplary productivity services. Synchronization of notecard files may occur transparently, through a user interface so that a user isn't left with a long list of notecard items that require users to manually mine and attempt to recreate a context for creation of a notecard item, among other issues. Examples of transparent synchronization comprise but are not limited to: user interface notifications that may be provided to a user regarding creation/storage of notecard items; receipt of user actions that visually identify created notecard items through a user interface of an exemplary notecard item management service; and suggestion of previously created notecard items for contextual relevance to working content of a digital document, among other examples.

In any instance, examples described herein enable exemplary notecard items to re-used or adapted for different contexts and cross-application (or cross-service) usage, thereby providing technical advantages including but not limited to: improving processing efficiency for applications/services in working with notecard items at run-time or near run-time; providing an adapted user interface that is configured for the creation and management of notecard items to improve operation of exemplary applications/services; achieving, through the adapted user interface, improved user interaction and productivity for users working with notecard items in exemplary application/services; improved processing efficiency for computing devices to recall previously created notecard items (including reduced latency in notecard item retrieval and presentation); improvements during operation of computing devices directed to processing efficiency (reduction in processing cycles) and better management of computer storage/memory during the creation and management of notecard items; cross-application/service enhancement including adaption and presentation for notecard items in a contextually relevant manner; and improved system/service examples that extend capabilities and functionality of associated applications/services, among other technical advantages.

FIG. 1 illustrates an exemplary method 100 related to creation and management of an exemplary notecard item, with which aspects of the present disclosure may be practiced. As an example, method 100 may be executed by an exemplary computing device (or computing devices) and/or system such as those shown in FIGS. 3-5. Operations performed in method 100 may correspond to operations executed by a system and/or service that execute computer programs, application programming interfaces (APIs), neural networks or machine-learning processing and semantic and entity understanding modeling, among other examples. As an example, processing operations executed in method 100 may be performed by one or more hardware components. In another example, processing operations executed in method 100 may be performed by one or more software components. In some examples, processing operations described in method 100 may be executed by one or more applications/services associated with a web service that has access to a plurality of application/services, devices, knowledge resources, etc. In one instance, processing operations described in method 100 may be implemented by one or more components connected over a distributed network.

Method 100 begins at processing operation 102, where an action is received for creation of an exemplary notecard item. While the description herein may reference creation of single notecard item, it is to be understood that examples described herein extend to actions that may create one or more notecard items. For instance, processing operation 104 comprises operations that determine a context for creation of a notecard item, which may yield a determination that more than one notecard item is to be automatically created on behalf of a user.

Figure 2A:
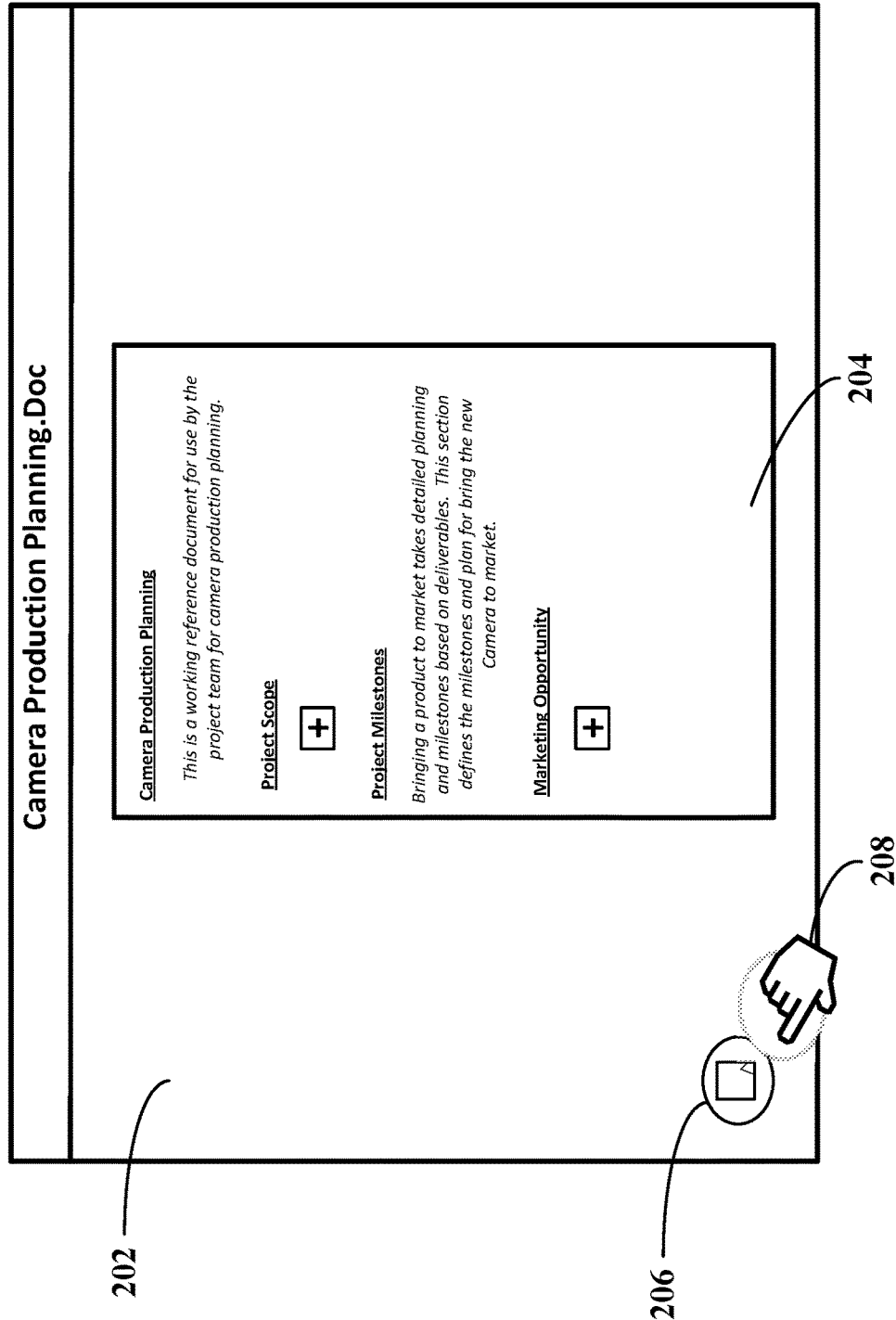
FIGS. 2A-2F illustrate exemplary processing device views associated with creation and management of exemplary notecard items, with which aspects of the present disclosure may be practiced.

An exemplary action (or multiple actions) may be any interaction with a user interface of an exemplary application/service or input recognition through a computing device that initiates creation of an exemplary notecard item. In one example, an exemplary user interface feature may be presented through a user interface of an application/service that enables quick creation of a notecard item. An example of a user interface feature for notecard creation is presented in processing device view 200 (FIG. 2A). In FIG. 2A, a user may execute an action 210 that selects user interface feature 208 to create an exemplary notecard item. However, examples are not so limited. In another example, a user interface feature for notecard creation may be presented through an application command control (e.g., ribbon) of an exemplary application service. In yet another instance, a user may enter device input (e.g., mouse-click operations, keyboard shortcuts, swipe actions) that initiate creation of an exemplary notecard item.

In other examples, a user interface of an application/service may be adapted and configured to recognize receipt (processing action 102) of specific actions within a digital canvas of an application/service as a trigger for creation of an exemplary notecard item. A digital document may comprise but is not limited to: an electronic file, website, social networking post, word documents, notes, documents, spreadsheet documents, blogs, etc. A digital canvas may be a workspace associated with a digital document that is provided through a user interface of an application/service. The digital canvas may comprise additional workspace bordering a main portion of workspace for a digital document. In one example, processing operation 102 may comprise receiving an action (or actions) that drag and drop content on a portion of the digital canvas (e.g. main workspace, additional workspace), which may be interpreted as a trigger for creating an exemplary notecard item. In another instance, a notecard item may be already created and displayed on a portion of the digital canvas, where a user drags and drops content on the created notecard item, which may be a trigger for generation of additional notecard items, grouping/stacking notecard items, etc. Examples described herein are not limited to drag and drop actions and may comprise other similar actions such as copy and paste actions or the like. Actions extend to examples that may be initiated in a first application/service and completed in another application/service. Other examples may relate to actions that move content within a digital document or across different digital documents of an exemplary application/service.

As referenced above, a notecard item is individual, self-contained digital data object that provides content to supplement a digital document. A notecard item may comprise any type of content, along or in aggregate, comprising but not limited to: text, rich content (including links, charts/graphs, multimedia, etc.), handwritten input and composite data objects (including layered content), among other examples. Exemplary notecard items live outside of an application/service, in which the notecard item is created or used, where a notecard item may be linked to a digital document but also exists as a separate object. For instance, an exemplary notecard file may be created for management of a created notecard item, where the notecard file is stored in one or more data storages (e.g., a local cache of a computing device and/or a distributed data storage) that is accessible by applications/services.

An exemplary productivity application/service is an application/service configured for execution to enable users to complete tasks on a computing device, where exemplary productivity services may be configured to work with notecard items (and interface with an exemplary notecard item management service). Examples of productivity services comprise but are not limited to: word processing applications/services, spreadsheet applications/services, notes/notetaking applications/services, authoring applications/services, digital presentation applications/services, search engine applications/services, email applications/services, messaging applications/services, web browsing applications/services, collaborative team applications/services, digital assistant services, directory applications/services, mapping services, calendaring services, electronic payment services, digital storage applications/services and social networking applications/services, among other examples. In some examples, an exemplary productivity application/service may be a component of a suite of productivity applications/services that may be configured to interface with other applications/services associated with a platform. For example, a word processing service may be included in a bundled service (e.g. Microsoft® Office365® or the like). Further, an exemplary productivity service may be configured to interface with other internet sources/services including third-party application/services, for example, to enhance functionality of the productivity service.

Flow of method 100 may proceed to processing operation 104, where a context for creation of a notecard item is determined. For instance, processing operation 104 may comprise evaluation of signal data associated with the one or more actions for notecard item creation. As an example, an API may be configured to collect signal data and access collected signal data for creation of an exemplary notecard file. Signal data may comprise but is not limited to: device-specific data, application-specific data, user-specific data, etc. Examples of device-specific data comprise but are not limited to: timestamp data; geo-locational data; account sign-in data; processing state at the time of notecard creation (including applications/services, documents, etc. being accessed); and device modality for access to an exemplary application/service, among other examples. Examples of application-specific data comprise but are not limited to: signal data from digital documents including analysis of data and metadata associated with digital documents; user actions received through applications/services including action for creation of the notecard item and subsequent actions to add content to a notecard item; application data (including telemetric data) collected by an exemplary application/service; signal data related to cross-application usage; signal data related to state of creation of an exemplary notecard item including previous layouts and formatting and content types; and signal data related to application/service preferences for display of notecard items, among other examples. Examples of user-specific data comprise but are not limited to: signal data related to user account login (e.g., to a service or platform of productivity services); signal data related to user profile, preference or user-specific themes; and determination of user intent (e.g., semantic analysis of action(s), user preferences, user history for a specific user or group of users), among other examples. Collection and analysis of exemplary signal data is known to one skilled in the field of art. Processing operation 104, comprises analyzing the signal data associated with the or more actions (e.g., the collective context surrounding the action(s) for notecard creation), which can be utilized for creation of an exemplary notecard file for the notecard item.

At processing operation 106, a notecard file is persisted for creation of the notecard item. Processing operation 106 comprises generation of a notecard file that persists, in a data storage, data (and metadata) and associated content for the notecard item. A notecard file may comprise data and metadata associated with a created notecard item as well as content portions/objects that are included in a notecard item. As an example, the notecard file may comprise one or more data objects that define the notecard item. Examples formats for the one or more data objects of a notecard file comprise but are not limited to hyper-text mark-up language (HTML) blobs and JavaScript Object notation (JSON) objects, although a variety of formats are possible and may be considered within the scope of the present disclosure. Data and metadata associated with objects defining a notecard item may be collected based on contextual analysis (processing operation 104) and subsequently memorialized in a notecard file.

Further, exemplary notecard files are extensible to include data and metadata fields that are specific to working with notecard items and usage of notecard items (and data from notecard files) within specific productivity applications/services. Exemplary data objects such as HTML blobs enable developers to collect and define specific data relative to working with notecard items. For instance, data/metadata may be specific to determination of a state of a notecard item, levels of fidelity for representation of notecard items in different contextual instances and across different applications/services, created links between notecard items and digital documents and/or other notecard items, preferences for displaying notecard items in specific productivity applications/services, classification of notecard items (that an exemplary notecard item management service may utilize for categorization and retrieval of notecard items); and grouping/aggregating notecard items, among other examples. Whether notecard items or grouped together or not, each notecard item may be associated with its own notecard file for, among other benefits, improvement of management and recall of created notecard items. While notecards items are associated with notecard files, examples described herein are configured to automatically occur on behalf of a user without a user having to separately management notecard files other than through usage within applications/services.

As referenced above, an exemplary notecard file is persisted (processing operation 106) in a data storage. One example of a data storage is a distributed data storage that is associated with an exemplary notecard item management service. An exemplary notecard item management service extends functionality of exemplary applications/services (e.g., productivity services) that are configured to present notecard items through a user interface. A notecard item management service is configured to interface with exemplary applications/services (e.g., productivity services) to enable creation of notecard files (for notecard items) as well as management of created notecard items. Notecard files may be stored and indexed in repositories (e.g., user-specific repositories) of an exemplary distributed data storage, similar to email mailboxes, and in a format suitable for indexing and searching. While the repositories may be user-specific, they may also be organized on a per-group or per-team basis or in some other similar manner. Another example of a data storage is a local cache, of a computing device executing an application/service (e.g., productivity service) that is creating the notecard item. Exemplary notecard items may be surfaced in a user interface of a productivity service from a notecard file stored in a local cache or in a distributed data storage. An exemplary notecard item management service is further configured to synchronize versions of notecard files that may be stored locally and those which are maintained on a distributed data storage.

Upon, creation (and update) of an exemplary notecard item, notecard files may be automatically propagated to the distributed data storage, thereby minimizing data loss and improving processing efficiency during execution of exemplary productivity services. This may occur transparently, through a user interface so that a user isn't left with a long list of notecard items that require users to manually mine and attempt to recreate a context for creation of a notecard item, among other issues. For instance, user interface notifications may be provided to a user regarding creation/storage of notecard items, actions may be received that visually identify created notecard items through a user interface of an exemplary notecard item management service and previously created notecard items may be suggested for contextual relevance to working content of a digital document, among other examples.

In some instances, an exemplary productivity service may be working offline, where the productivity service is configured to utilize a local data storage (e.g., local cache) of a computing device to manage creation of notecard files and collection of data and metadata associated with the creation of a notecard file. In such instances, data for a notecard file may be stored in a local data storage and synchronized (processing operation 108) with a distributed data storage (e.g., associated with the notecard item management service) at a point in time when the productivity service is back online. An exemplary productivity service may be configured to continuously attempt to communicate with the notecard item management service in order to maintain consistency for created notecard items.

Exemplary notecard files may be continuously updated (in real-time or near real-time), where data (and metadata) fields may be updated after a notecard file is created. For instance, a notecard file (and corresponding notecard item) may be created locally on a computing device (and stored in a local cache) in instances where a user is offline or not connected with an exemplary notecard item management service. In such an example, an exemplary notecard file may be completed as much as possible with limited signal data collected and analyzed as compared to the additional resources that are available when an exemplary notecard item management service is active (and interfacing with other platform applications/services). Signal data may be supplemented and re-analyzed at a point in which a notecard file is synchronized with a distributed data storage.

Flow of method 100 may proceed to processing operation 110, where a notecard item is presented. As an example, processing operation 110 comprises, presenting, through a user interface of a productivity service, a representation of the persisted notecard item on a digital canvas of a digital document. Presentation of a notecard item may retrieve and surface a representation of the notecard item from either a version of the notecard file maintained by the local cache or a version of the notecard file maintained by the distributed data storage. Contextual analysis of action(s) for creation of a notecard item may factor into a representation of the notecard item that is presented through the user interface. For instance, a user may insert text content onto a notecard item, where a prior action added image content to the notecard item. In such an example, a representation of the notecard item may utilize data (and metadata) from the notefile file to determine layout and formatting for content of the notecard item, for example, as a single notecard item, create multiple notecard items, etc. Contextual analysis may also factor into animation that accompanies presentation of an exemplary notecard item.

Further, an exemplary productivity service and/or notecard item management may be configured to suggest context, based on contextual analysis, that may be associated with notecard items. Suggestions may be surfaced within a digital canvas of a digital document and/or associated with specific notecard items (e.g., notifications, user interface call-outs).

Flow of method 100 may proceed to decision operation 112. At decision operation 112, it is determined whether an update occurs to the notecard item (e.g., representation of the notecard item). Examples of triggers for update to a notecard item comprise but are not limited to: user-initiated modifications to notecard items, update to data in notecard files, and automatic update to notecard items by the notecard item management service (e.g., adding content based on contextual analysis, generating suggestions for modification of notecard items). In examples where no update occurs to the notecard item, flow of decision operation 112 branches NO and processing of method 100 remains idle until subsequent processing is to be executed. In examples where an update occurs to the notecard item, flow of decision operation 112 branches YES, where processing of method 100 returns to processing operation 106. Update to an exemplary notecard item may occur based on one of the above identified triggers.

FIGS. 2A-2F illustrate exemplary processing device views associated with creation and management of exemplary notecard items, with which aspects of the present disclosure may be practiced. FIGS. 2A-2F illustrate front-end user interface examples of processing operations described in the foregoing description including method 100 (FIG. 1).

FIG. 2A illustrates processing device view 200. Processing device view 200 provides an initial example for notecard item creation through a user interface of an exemplary productivity service. Examples of productivity services have been provided in the foregoing description. In the example illustrated in processing device view 200, the productivity service is a word processing service, where the user interface is presenting a digital document (Camera Production Planning.doc). In actual implementation, the user interface of a productivity service comprises other user interface features including application command control, which are not shown in the provided example, but are known to one skilled in the field of art. An exemplary digital canvas 202 is displayed in the user interface of the word processing service, wherein the digital canvas 202 further comprises a digital document 204 that is being accessed. Moreover, the digital canvas 202 further comprises a user interface feature 206 for quick creation of a notecard item. Alternative examples for initiation of creation of a notecard item have been provided in the foregoing description. Processing device view 200 further comprises illustration of an exemplary action 208 for initiation of creation of an exemplary notecard item. For example, the action 208 may correspond to input that selects the user interface feature 206 for quick creation of a notecard item.

Figure 2B:
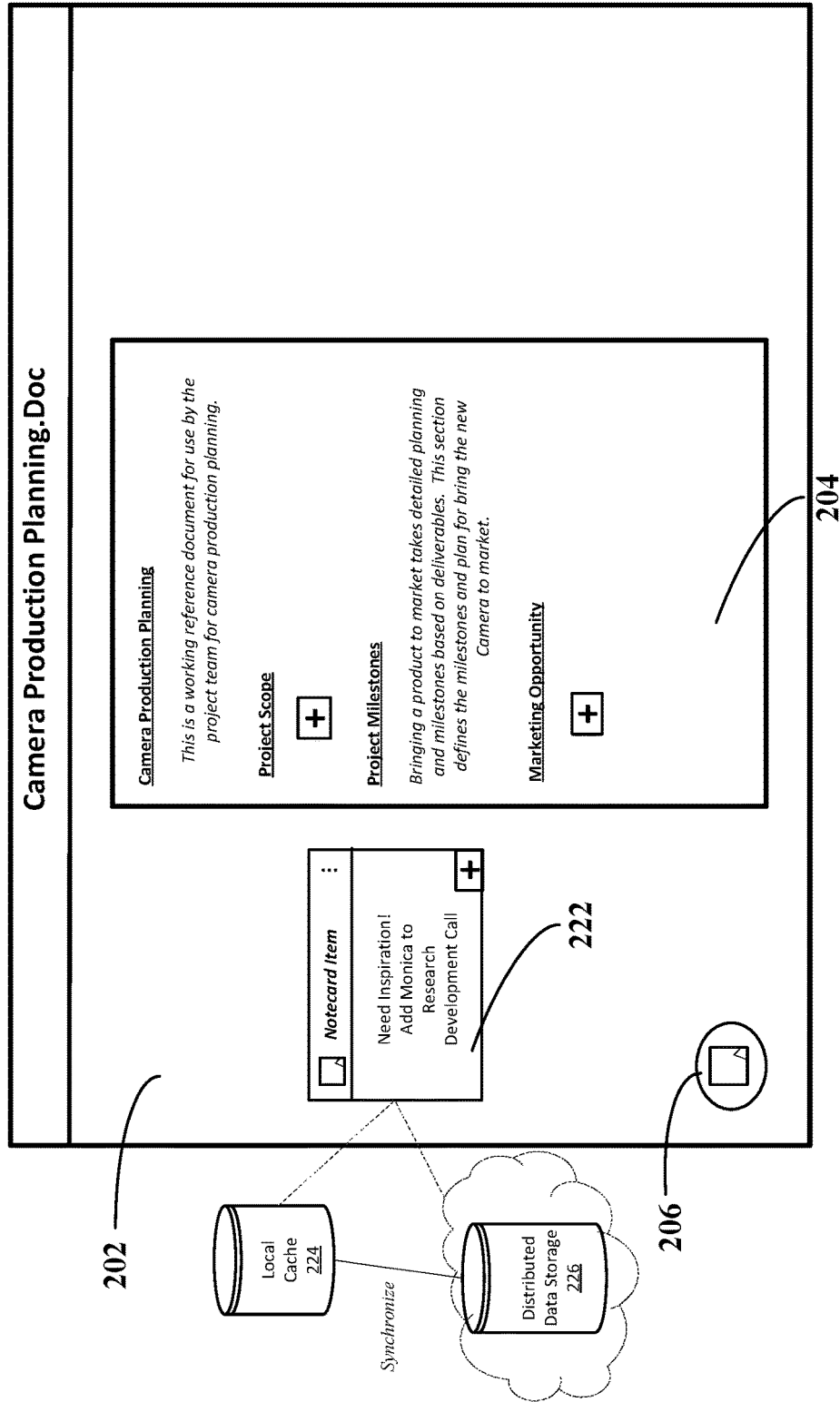

FIG. 2B illustrates processing device view 220, providing a continuing example of selection (i.e. action 208) of the user interface feature 206 for initiation of creation of a notecard item. As described in the foregoing description, a user may execute multiple actions for the creation of an exemplary notecard item. In addition to selection of user interface feature 206 shown in processing device view 200, a user may further take action by adding content (Need Inspiration! Add Monica to Research Development Call) to a displayed notecard item 222. On the back-end, creation of an exemplary notecard item 222 comprises generation of an exemplary notecard file that may be persisted in a local cache 224 and/or a distributed data storage 226 (e.g., that is associated with an exemplary notecard item management service).

Figure 2C:
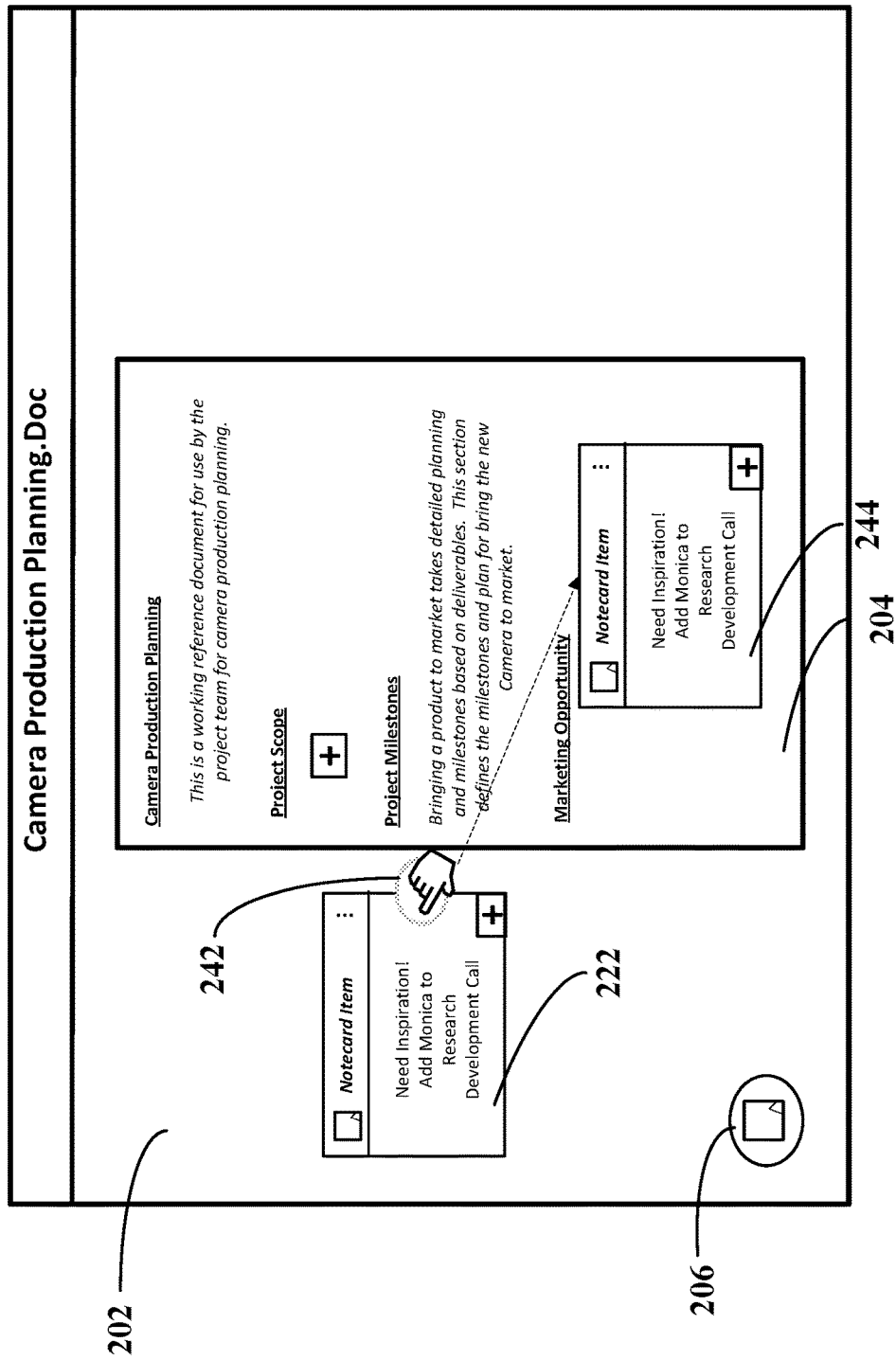

FIG. 2C illustrates processing device view 240, providing an example of placement of a created notecard item. As shown in processing device view 240, action 242 is received to drag and drop the notecard item 222 on the digital document 204 displayed through the user interface. As shown in processing device view 240, a representation 244 of the notecard item is layered over content of the digital document 204 based on processing of the action 242. The representation 244 of the notecard item creates the appearance of a "sticky note" being attached to the digital document 204. As described in the foregoing description, animation may accompany insertion (or movement) of a notecard item to emphasize, through the user interface, an exemplary notecard item. In alternative examples, representation 244 of the notecard item may be an initial insertion point for presentation of notecard item 222.

Figure 2D:
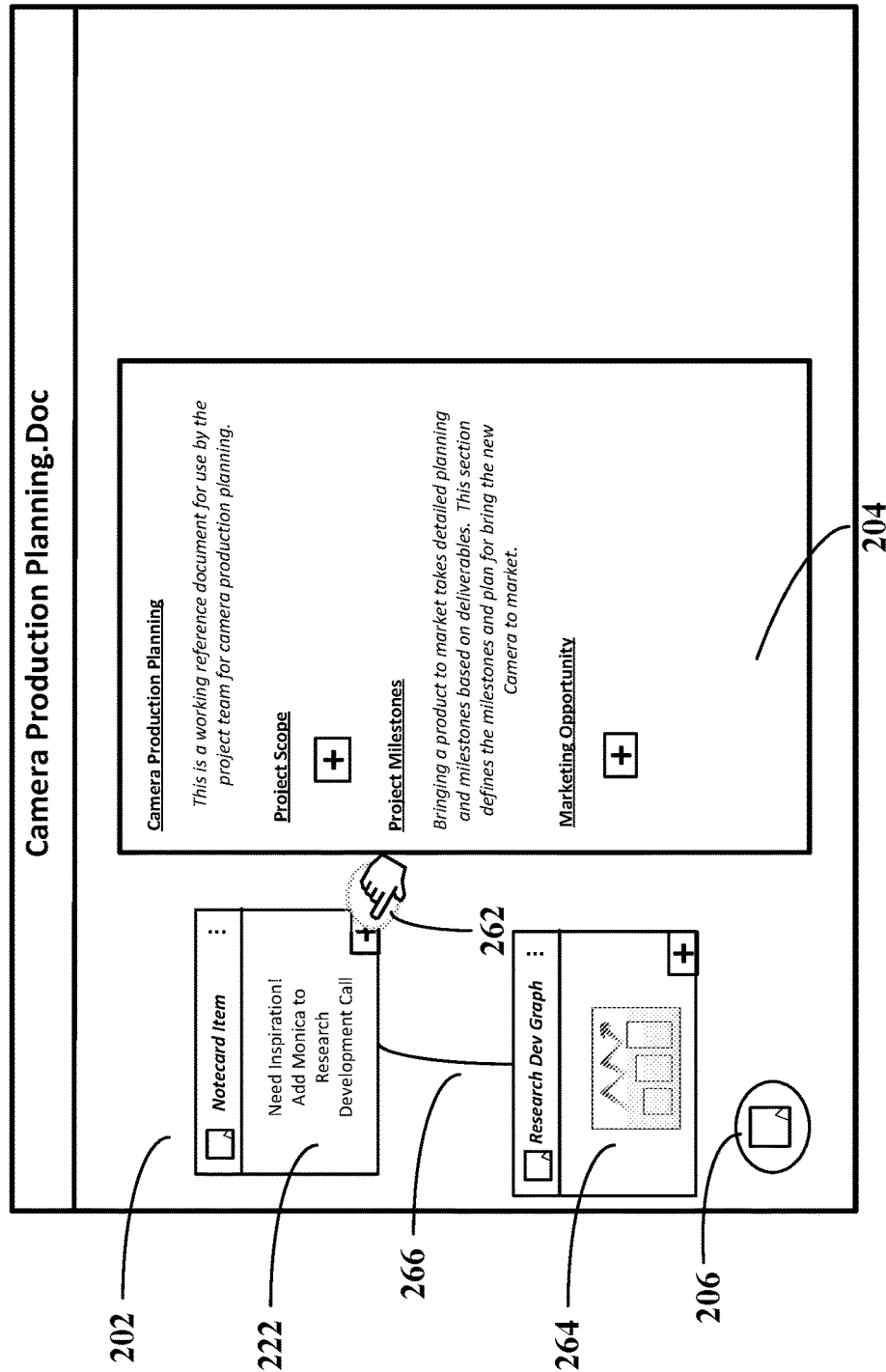

FIG. 2D illustrates processing device view 260, providing an example of selection of a user interface feature associated with an exemplary notecard item 222. In the example shown in processing device view 260, a user executed an action 262 that corresponds to creation of an additional notecard item 264 from the originally created notecard item 222. As referenced in the foregoing description, contextual analysis of an action, state of a digital document, etc., may play into presentation of exemplary notecard items. For instance, contextual analysis may yield determinations including but not limited to: how many notecard items to create, how to animate creation of the additional notecard items, how to arrange content across the newly created notecard items, whether to auto-insert or suggest content for inclusion in a new notecard item, whether creation of the notecard items affects the representation of an originally created notecard and whether to group the notecard items in a stack representation, among other examples. Moreover, notecard items that are created from an original notecard item may maintain a metadata link (illustrated in processing device view 260 by line 266) marking an association between notecard items (e.g., metadata link between notecard item 222 and notecard item 264). While a link is maintained between similarly created notecard items, it is to be understood that creation of the additional notecard item 262 also creates an exemplary notecard file for the additional notecard item 262.

As referenced above, an exemplary notecard item management service may be configured to manage created notecard items and associations/links between notecard items. In some examples, links between notecard items may be visually emphasized in a graphical form (e.g., map of related ideas (between notecard items)). In such instances, an exemplary notecard item management service may be configured to access and evaluate notecard files (associated with notecard items), where data within the notecard files may be used to identify related notecard items, links between notecard items, etc. Graphical representation(s) of relationships between notecard items may be surfaced within an exemplary application/service thereby enhancing a user interface through the automatic provision of contextually relevant content (i.e. notecard items) including content that a user may not be presently aware of. This also improves productivity and efficiency of both client computing devices (e.g., data retrieval processing) as well as applications/services (e.g., improved user interface, cross-service usage and sharing of data) through surfacing of contextually relevant notecard items. An exemplary graphical representation may be organized based on any type of data associated with notecard files including keywords, timestamp data, user creation data, usage data, keywords, etc., as well as other classification data (e.g., categorical classification). Furthermore, as notecard items are added or modified, exemplary graphical representations may be updated/adapted in real-time (or near real-time).

Figure 2E:
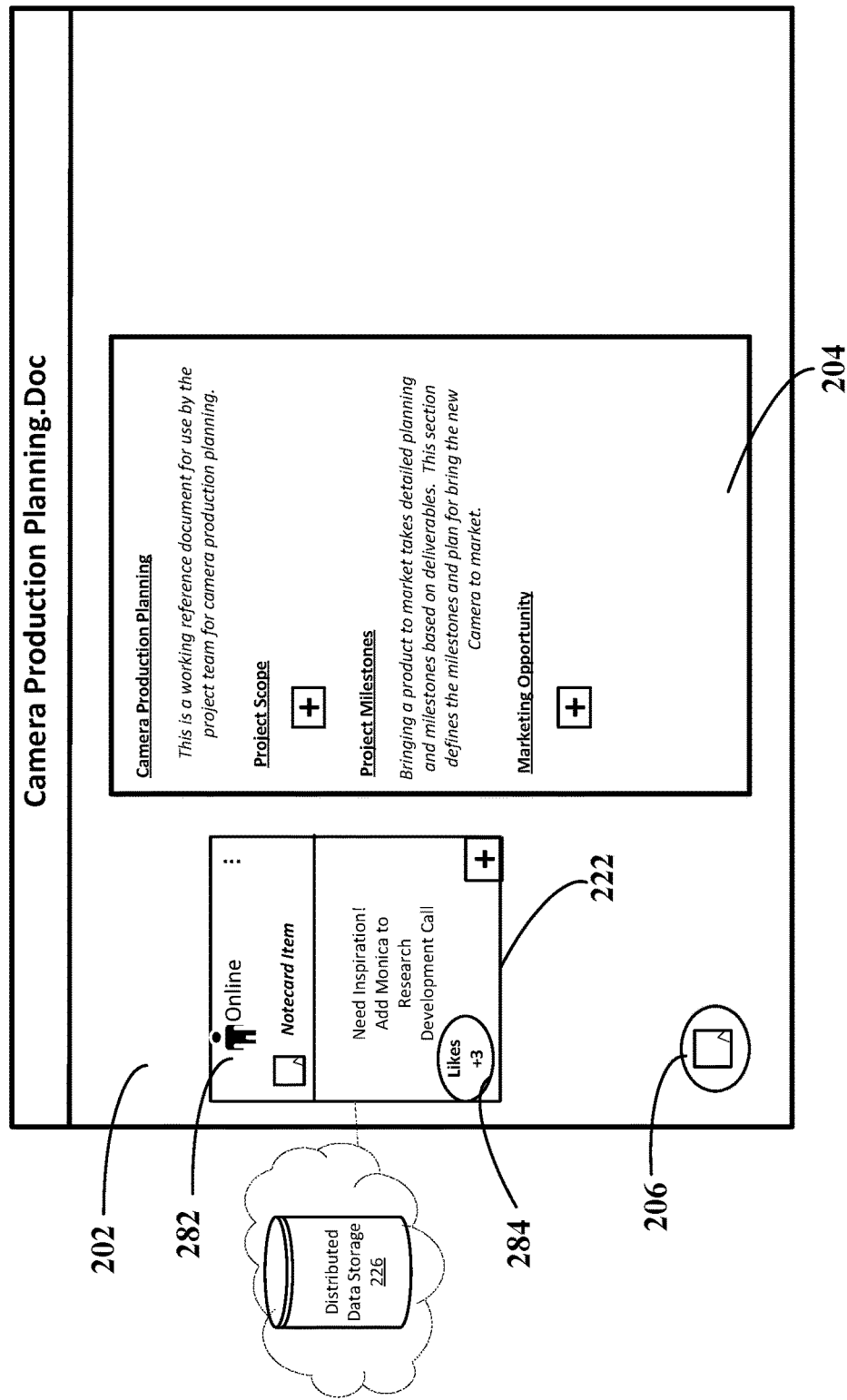

FIG. 2E illustrates processing device view 280, providing an example of contextual update of an exemplary notecard item 222. As described in the foregoing description, an exemplary notecard item management service may be configured to execute contextual analysis related to actions for notecard creation. Processing device view 280 illustrates a correspondence with access to distributed data storage 226, where an electronic notecard file for notecard item 222 may be persisted. Determination of a context associated with creation of the notecard item 222 may yield a determination to automatically add contextual (rich) content (or alternatively suggestions for addition of contextual content) to a notecard item. In the example shown in processing device view 280, user contact rich content 282 and interactive social media rich content 284 are automatically added to enhance notecard item 222, for example, based on continuous signal data evaluation related to creation of the notecard item and on-going activity with the created notecard item.

Figure 2F:
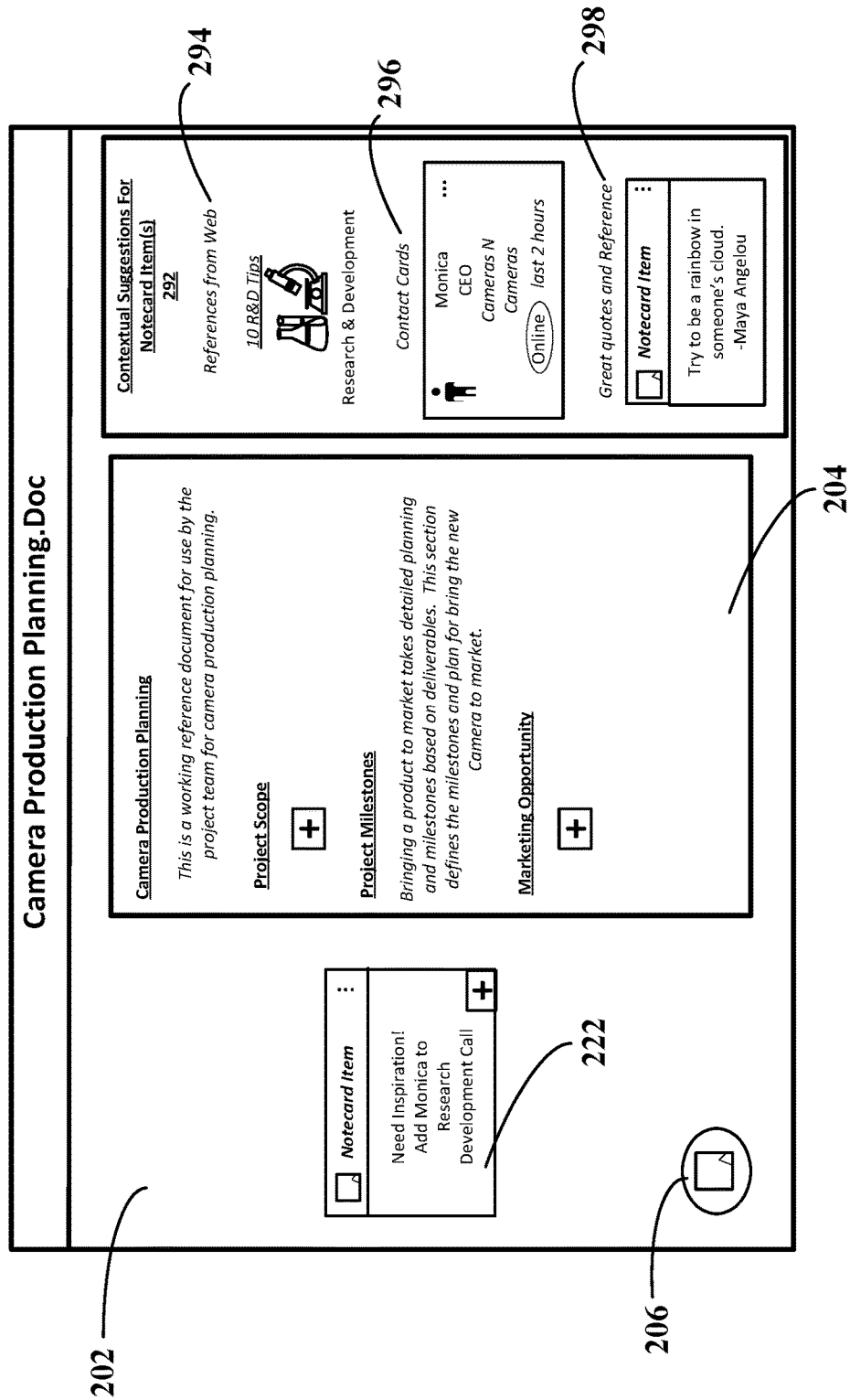

FIG. 2F illustrates processing device view 290, providing an example of contextual suggestions for creation (and/or modification) of an exemplary notecard item. A user interface of an exemplary productivity service may be adapted to provide contextual suggestions that may enhance notecard creation. An exemplary contextual suggestion listing 292, for creation of notecard items, may be surfaced through a user interface of the productivity service in which an exemplary notecard item 222 is being created. For example, the contextual suggestion listing 292 may be surfaced in a digital canvas 202 of the user interface. In alternative examples, the contextual suggestion listing 292 may be surfaced by a different application/service and simultaneously presented in coordination with presentation of the notecard item 222. Suggestions within the exemplary contextual suggestion listing 292 may be content that is retrieved from different distributed resources such as applications/services. Contextual suggestions 294-298 are non-limiting examples of distributed resources in which contextual suggestions may be retrieved. In the example shown in processing device view 290, contextual suggestion 294 is retrieved from a web index and provides a rich data link to research and development tips, which appear to contextually relate to the content of the created notecard item 222. Contextual suggestion 296 is retrieved from a user's electronic contact listing as a suggestion for reference to the name "Monica" in the created notecard item 222. Contextual suggestion 298 is retrieved from an exemplary notecard item management service and presents a previously created notecard that a user may wish to consider associating with exemplary notecard item 222 and/or digital document 204.

Figure 3:
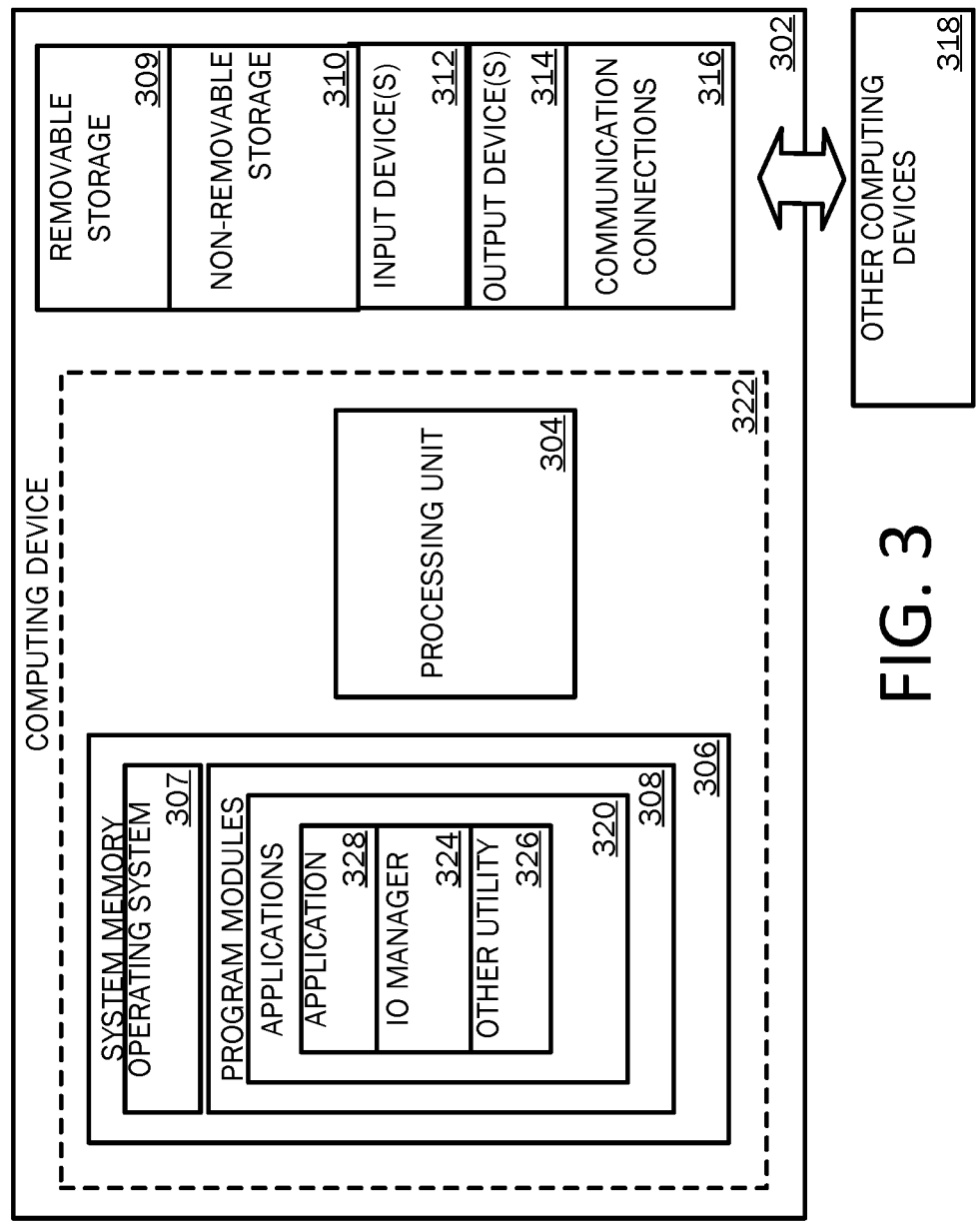
FIG. 3 is a block diagram illustrating an example of a computing device with which aspects of the present disclosure may be practiced.
Figure 4A:
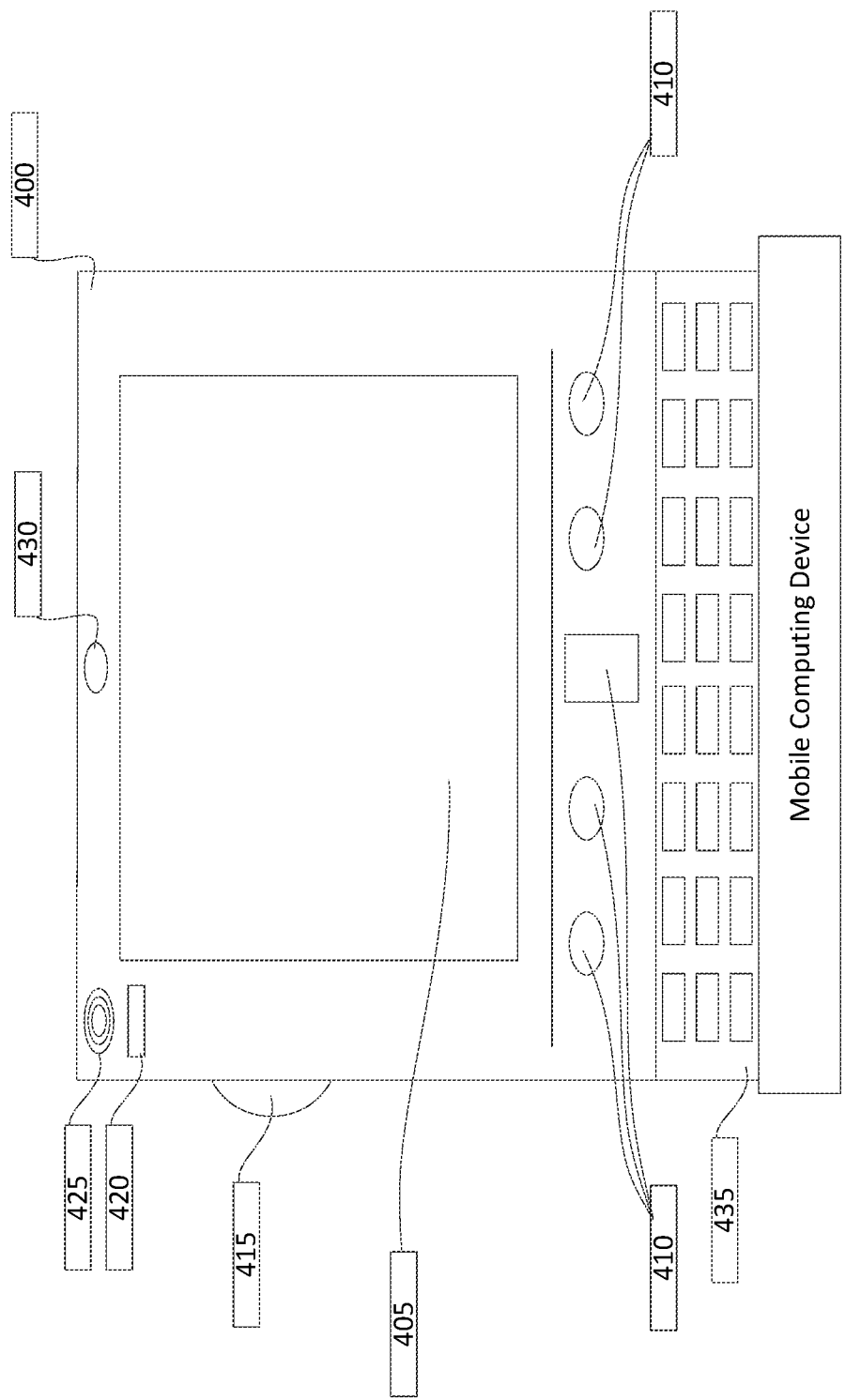
FIGS. 4A and 4B are simplified block diagrams of a mobile computing device with which aspects of the present disclosure may be practiced.
Figure 4B:
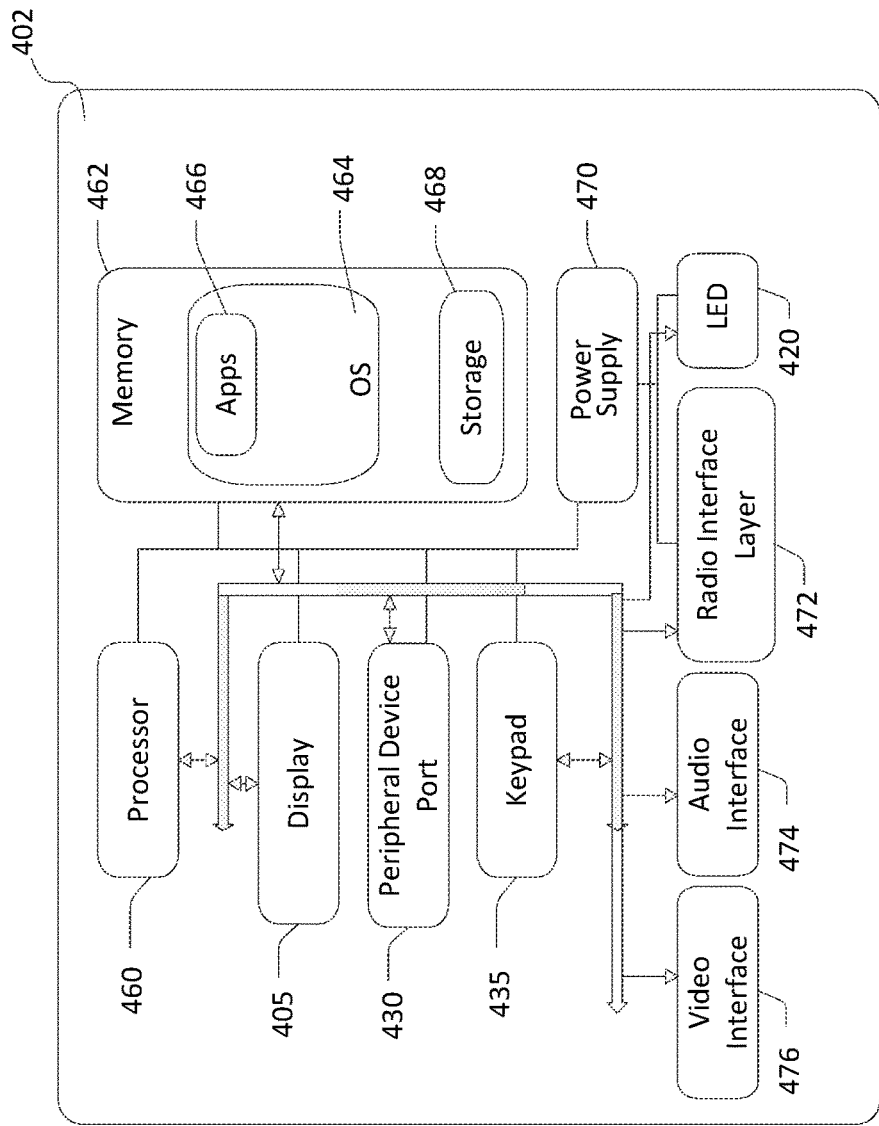
Figure 5:
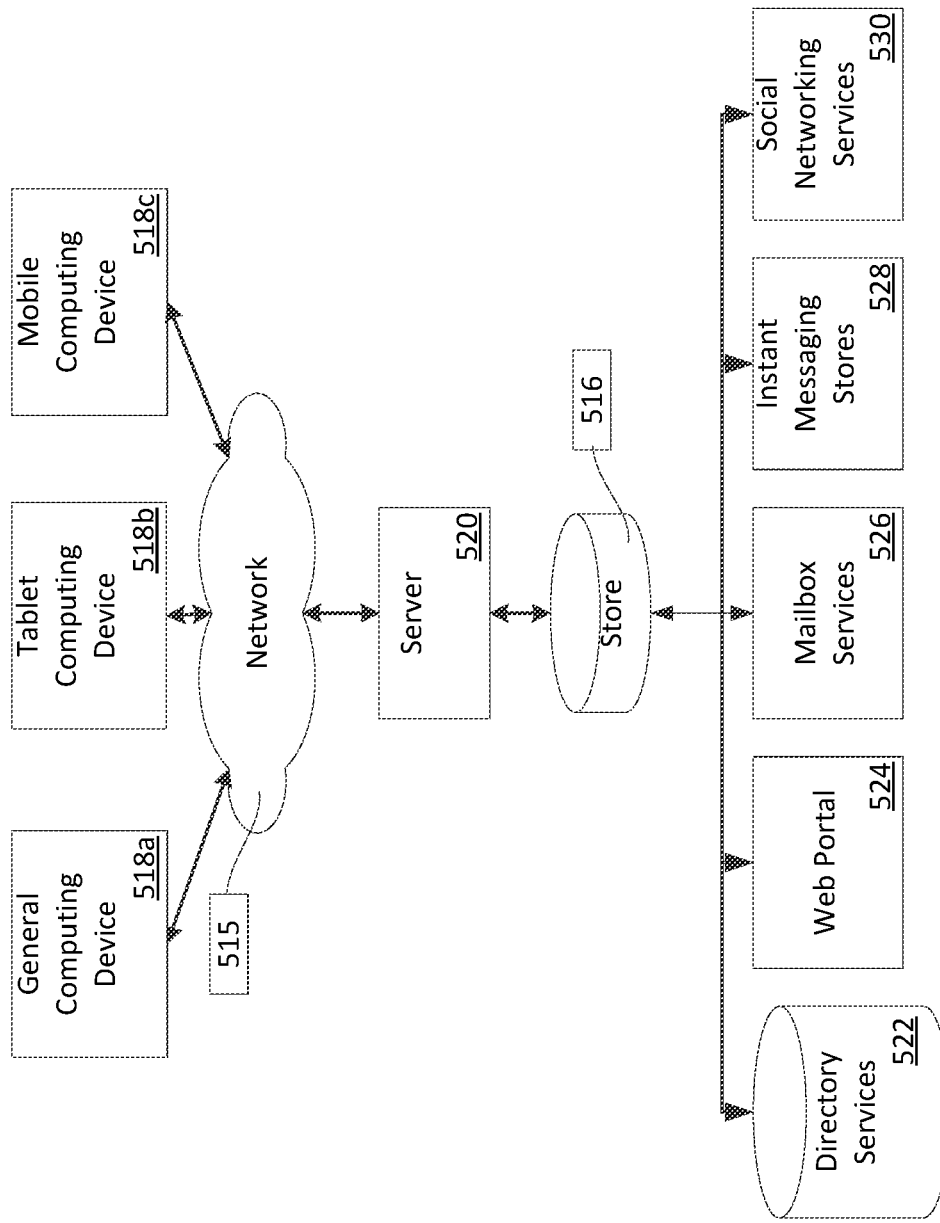
FIG. 5 is a simplified block diagram of a distributed computing system in which aspects of the present disclosure may be practiced.

FIGS. 3-5 and the associated descriptions provide a discussion of a variety of operating environments in which examples of the invention may be practiced. However, the devices and systems illustrated and discussed with respect to FIGS. 3-5 are for purposes of example and illustration and are not limiting of a vast number of computing device configurations that may be utilized for practicing examples of the invention, described herein.

FIG. 3 is a block diagram illustrating physical components of a computing device 302, for example a mobile processing device, with which examples of the present disclosure may be practiced. Among other examples, computing device 302 may be an exemplary computing device configured for creation and management of exemplary notecard items as described herein. In a basic configuration, the computing device 302 may include at least one processing unit 304 and a system memory 306. Depending on the configuration and type of computing device, the system memory 306 may comprise, but is not limited to, volatile storage (e.g., random access memory), non-volatile storage (e.g., read-only memory), flash memory, or any combination of such memories. The system memory 306 may include an operating system 307 and one or more program modules 308 suitable for running software programs/modules 320 such as IO manager 324, other utility 326 and application 328. As examples, system memory 306 may store instructions for execution. Other examples of system memory 306 may store data associated with applications. The operating system 307, for example, may be suitable for controlling the operation of the computing device 302. Furthermore, examples of the invention may be practiced in conjunction with a graphics library, other operating systems, or any other application program and is not limited to any particular application or system. This basic configuration is illustrated in FIG. 3 by those components within a dashed line 322. The computing device 302 may have additional features or functionality. For example, the computing device 302 may also include additional data storage devices (removable and/or non-removable) such as, for example, magnetic disks, optical disks, or tape. Such additional storage is illustrated in FIG. 3 by a removable storage device 309 and a non-removable storage device 310.

As stated above, a number of program modules and data files may be stored in the system memory 306. While executing on the processing unit 304, program modules 308 (e.g., Input/Output (I/O) manager 324, other utility 326 and application 328) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 402 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 302 may also have one or more input device(s) 312 such as a keyboard, a mouse, a pen, a sound input device, a device for voice input/recognition, a touch input device, etc. The output device(s) 314 such as a display, speakers, a printer, etc. may also be included. The aforementioned devices are examples and others may be used. The computing device 302 may include one or more communication connections 316 allowing communications with other computing devices 318. Examples of suitable communication connections 316 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 306, the removable storage device 309, and the non-removable storage device 310 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 302. Any such computer storage media may be part of the computing device 302. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 4A and 4B illustrate a mobile computing device 400, for example, a mobile telephone, a smart phone, a personal data assistant, a tablet personal computer, a phablet, a slate, a laptop computer, and the like, with which examples of the invention may be practiced. Mobile computing device 400 may be an exemplary computing device configured for creation and management of exemplary notecard items as described herein. Application command control may be provided for applications executing on a computing device such as mobile computing device 400. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 4A, one example of a mobile computing device 400 for implementing the examples is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. The display 405 of the mobile computing device 400 may also function as an input device (e.g., touch screen display). If included, an optional side input element 415 allows further user input. The side input element 415 may be a rotary switch, a button, or any other type of manual input element. In alternative examples, mobile computing device 400 may incorporate more or less input elements. For example, the display 405 may not be a touch screen in some examples. In yet another alternative example, the mobile computing device 400 is a portable phone system, such as a cellular phone. The mobile computing device 400 may also include an optional keypad 435. Optional keypad 435 may be a physical keypad or a "soft" keypad generated on the touch screen display or any other soft input panel (SIP). In various examples, the output elements include the display 405 for showing a GUI, a visual indicator 420 (e.g., a light emitting diode), and/or an audio transducer 425 (e.g., a speaker). In some examples, the mobile computing device 400 incorporates a vibration transducer for providing the user with tactile feedback. In yet another example, the mobile computing device 400 incorporates input and/or output ports, such as an audio input (e.g., a microphone jack), an audio output (e.g., a headphone jack), and a video output (e.g., a HDMI port) for sending signals to or receiving signals from an external device.

FIG. 4B is a block diagram illustrating the architecture of one example of a mobile computing device. That is, the mobile computing device 400 can incorporate a system (i.e., an architecture) 402 to implement some examples. In one examples, the system 402 is implemented as a "smart phone" capable of running one or more applications (e.g., browser, e-mail, calendaring, contact managers, messaging clients, games, and media clients/players). In some examples, the system 402 is integrated as a computing device, such as an integrated personal digital assistant (PDA), tablet and wireless phone.

One or more application programs 466 may be loaded into the memory 462 and run on or in association with the operating system 464. Examples of the application programs include phone dialer programs, e-mail programs, personal information management (PIM) programs, word processing programs, spreadsheet programs, Internet browser programs, messaging programs, and so forth. The system 402 also includes a non-volatile storage area 468 within the memory 462. The non-volatile storage area 468 may be used to store persistent information that should not be lost if the system 402 is powered down. The application programs 466 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device (e.g. system 402) described herein.

The system 402 has a power supply 470, which may be implemented as one or more batteries. The power supply 470 might further include an external power source, such as an AC adapter or a powered docking cradle that supplements or recharges the batteries.

The system 402 may include peripheral device port 430 that performs the function of facilitating connectivity between system 402 and one or more peripheral devices. Transmissions to and from the peripheral device port 430 are conducted under control of the operating system (OS) 464. In other words, communications received by the peripheral device port 430 may be disseminated to the application programs 466 via the operating system 464, and vice versa.

The system 402 may also include a radio interface layer 472 that performs the function of transmitting and receiving radio frequency communications. The radio interface layer 472 facilitates wireless connectivity between the system 402 and the "outside world," via a communications carrier or service provider. Transmissions to and from the radio interface layer 472 are conducted under control of the operating system 464. In other words, communications received by the radio interface layer 472 may be disseminated to the application programs 566 via the operating system 464, and vice versa.

The visual indicator 420 may be used to provide visual notifications, and/or an audio interface 474 may be used for producing audible notifications via the audio transducer 425 (as described in the description of mobile computing device 400). In the illustrated example, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425 (shown in FIG. 4A), the audio interface 474 may also be coupled to a microphone to receive audible input, such as to facilitate a telephone conversation. In accordance with examples of the present invention, the microphone may also serve as an audio sensor to facilitate control of notifications, as will be described below. The system 402 may further include a video interface 476 that enables an operation of an on-board camera 430 to record still images, video stream, and the like.

A mobile computing device 400 implementing the system 402 may have additional features or functionality. For example, the mobile computing device 400 may also include additional data storage devices (removable and/or non-removable) such as, magnetic disks, optical disks, or tape. Such additional storage is illustrated in FIG. 4B by the non-volatile storage area 468.

Data/information generated or captured by the mobile computing device 400 and stored via the system 402 may be stored locally on the mobile computing device 400, as described above, or the data may be stored on any number of storage media that may be accessed by the device via the radio 472 or via a wired connection between the mobile computing device 400 and a separate computing device associated with the mobile computing device 400, for example, a server computer in a distributed computing network, such as the Internet. As should be appreciated such data/information may be accessed via the mobile computing device 400 via the radio 472 or via a distributed computing network. Similarly, such data/information may be readily transferred between computing devices for storage and use according to well-known data/information transfer and storage means, including electronic mail and collaborative data/information sharing systems.

FIG. 5 illustrates one example of the architecture of a system for providing an application that reliably accesses target data on a storage system and handles communication failures to one or more client devices, as described above. The system of FIG. 5 may be an exemplary system configured for creation and management of exemplary notecard items as described herein. Target data accessed, interacted with, or edited in association with programming modules 308 and/or applications 320 and storage/memory (described in FIG. 3) may be stored in different communication channels or other storage types. For example, various documents may be stored using a directory service 522, a web portal 524, a mailbox service 526, an instant messaging store 528, or a social networking site 530, IO manager 324, other utility 326, application 328 and storage systems may use any of these types of systems or the like for enabling data utilization, as described herein. A server 520 may provide storage system for use by a client operating on general computing device 302 and mobile device(s) 400 through network 515. By way of example, network 515 may comprise the Internet or any other type of local or wide area network, and a client node may be implemented for connecting to network 515. Examples of a client node comprise but are not limited to: a computing device 302 embodied in a personal computer, a tablet computing device, and/or by a mobile computing device 400 (e.g., mobile processing device). As an example, a client node may connect to the network 515 using a wireless network connection (e.g. WiFi connection, Bluetooth, etc.). However, examples described herein may also extend to connecting to network 515 via a hardwire connection. Any of these examples of the client computing device 302 or 400 may obtain content from the store 516.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
   receiving, within a digital document of a productivity service, one or more actions to create a notecard item;
   determining a context for creation of the notecard item based on analysis of signal data associated with the one or more actions to create the notecard item;
   persisting, in a data storage, the notecard item as a notecard file that is a separate file from the digital document, wherein the notecard file comprises content for the notecard item and one or more data objects that comprise: metadata associated with the determined context for creation of the notecard item, and data associated with content suggestions to add to a representation of the notecard item based on the determined context; and
   presenting, through a user interface of the productivity service, a representation of the persisted notecard item on a digital canvas of the digital document, wherein the representation of the persisted notecard item comprises the content for the notecard item and one or more items of suggested content selected for the determined context based on the content suggestions.

2. The method of claim 1, wherein the one or more actions comprise a drag and drop action that drags content to the digital canvas of the digital document.

3. The method of claim 1, wherein the data storage is a local cache, within a computing device, that is associated with the productivity service, and wherein the presenting further comprises retrieving the notecard file from the local cache and surfacing the representation of the notecard item based on the retrieved notecard file.

4. The method of claim 3, further comprising: synchronizing, from the local cache with a distributed data storage associated with a notecard item management service, the notecard file.

5. The method of claim 1, wherein the content suggestions comprise one or more rich data objects generated based on the determined context for creation of the notecard item, and wherein the representation of the persisted notecard item, presented through the user interface, comprises the one or more rich data objects.

6. The method of claim 5, wherein the one or more rich data objects are one or more selected from a group that comprises: user contact data associated with a user account of the productivity service and a social networking link associated with usage of the notecard item through the productivity service.

7. The method of claim 1, wherein the one or more actions adds two or more portions of content to the notecard item, wherein the one or more data objects, associated with the notecard file, further comprise data associated with stack creation of the notecard item based on the determined context, and wherein the representation of the of the persisted notecard item, presented through the user interface, comprises a stack of at least two notecards that comprise the two or more portions of content and the one or more items of suggested content.

8. A system comprising:
at least one processor; and
a memory, operatively connected with the at least one processor, storing computer-executable instructions that, when executed by the at least one processor, causes the at least one processor to execute a method that comprises:
receiving, within a digital document of a productivity service, one or more actions to create a notecard item;
determining a context for creation of the notecard item based on analysis of signal data associated with the one or more actions to create the notecard item;
persisting, in a data storage, the notecard item as a notecard file that is a separate file from the digital document, wherein the notecard file comprises content for the notecard item and one or more data objects that comprise: metadata associated with the determined context for creation of the notecard item, and data associated with content suggestions to add to a representation of the notecard item based on the determined context; and
presenting, through a user interface of the productivity service, a representation of the persisted notecard item on a digital canvas of the digital document, wherein the representation of the persisted notecard item comprises the content for the notecard item and one or more items of suggested content selected for the determined context based on the content suggestions.

9. The system of claim 8, wherein the one or more actions comprise a drag and drop action that drags content to the digital canvas of the digital document.

10. The system of claim 8, wherein the data storage is a local cache, within a computing device, that is associated with the productivity service, and wherein the presenting further comprises retrieving the notecard file from the local cache and surfacing the representation of the notecard item based on the retrieved notecard file.

11. The system of claim 10, wherein the method, executed by the at least one processor, further comprises: synchronizing, from the local cache with a distributed data storage associated with a notecard item management service, the notecard file.

12. The system of claim 8, wherein the content suggestions comprise one or more rich data objects generated based on the determined context for creation of the notecard item, and wherein the representation of the persisted notecard item, presented through the user interface, comprises the one or more rich data objects.

13. The system of claim 12, wherein the one or more rich data objects are one or more selected from a group that comprises: user contact data associated with a user account of the productivity service and a social networking link associated with usage of the notecard item through the productivity service.

14. The system of claim 8, wherein the one or more actions adds two or more portions of content to the notecard item, wherein the one or more data objects, associated with the notecard file, further comprise data associated with stack creation of the notecard item based on the determined context, and wherein the representation of the of the persisted notecard item, presented through the user interface, comprises a stack of at least two notecards that comprise the two or more portions of content and the one or more items of suggested content.

15. A computer-readable storage medium storing computer-executable instructions that, when executed by at least one processor, causes the at least one processor to execute a method comprising:
receiving, within a digital document of a productivity service, one or more actions to create a notecard item;
determining a context for creation of the notecard item based on analysis of signal data associated with the one or more actions to create the notecard item;
persisting, in a data storage, the notecard item as a notecard file that is a separate file from the digital document, wherein the notecard file comprises content for the notecard item and one or more data objects that comprise: metadata associated with the determined context for creation of the notecard item, and data associated with content suggestions to add to a representation of the notecard item based on the determined context; and
presenting, through a user interface of the productivity service, a representation of the persisted notecard item on a digital canvas of the digital document, wherein the representation of the persisted notecard item comprises the content for the notecard item and one or more items of suggested content selected for the determined context based on the content suggestions.

16. The computer-readable storage medium of claim 15, wherein the one or more actions comprise a drag and drop action that drags content to the digital canvas of the digital document.

17. The computer-readable storage medium of claim 15, wherein the data storage is a local cache, within a computing device, that is associated with the productivity service, wherein the presenting further comprises retrieving the notecard file from the local cache and surfacing the representation of the notecard item based on the retrieved notecard file, and wherein the executed method further comprising: synchronizing, from the local cache with a distributed data storage associated with a notecard item management service, the notecard file.

18. The computer-readable storage medium of claim 15, wherein the content suggestions comprise one or more rich data objects generated based on the determined context for creation of the notecard item, and wherein the representation of the persisted notecard item, presented through the user interface, comprises the one or more rich data objects.

19. The computer-readable storage medium of claim 18, wherein the one or more rich data objects are one or more selected from a group that comprises: user contact data associated with a user account of the productivity service and a social networking link associated with usage of the notecard item through the productivity service.

20. The computer-readable storage medium of claim 15, wherein the one or more actions adds two or more portions of content to the notecard item, wherein the one or more data objects, associated with the notecard file, further comprise data associated with stack creation of the notecard item based on the determined context, and wherein the representation of the of the persisted notecard item, presented through the user interface, comprises a stack of at least two notecards that comprise the two or more portions of content and the one or more items of suggested content.

* * * * *